(12) United States Patent
El-Ouardi et al.

(10) Patent No.: US 10,871,827 B2
(45) Date of Patent: Dec. 22, 2020

(54) TACTILE INTERFACE MODULE AND METHOD FOR GENERATING HAPTIC FEEDBACK

(71) Applicant: DAV, Créteil (FR)

(72) Inventors: Nour-Eddine El-Ouardi, Créteil (FR); Anthony Aubry, Creteil (FR)

(73) Assignee: DAV, Créteil (FR)

( * ) Notice: Subject to any disclaimer, the term of this patent is extended or adjusted under 35 U.S.C. 154(b) by 84 days.

(21) Appl. No.: 15/767,692

(22) PCT Filed: Oct. 13, 2016

(86) PCT No.: PCT/EP2016/074640
§ 371 (c)(1),
(2) Date: Aug. 10, 2018

(87) PCT Pub. No.: WO2017/064219
PCT Pub. Date: Apr. 20, 2017

(65) Prior Publication Data
US 2018/0364805 A1 Dec. 20, 2018

(30) Foreign Application Priority Data
Oct. 13, 2015 (FR) .................................... 15 59741

(51) Int. Cl.
*G06F 3/041* (2006.01)
*G06F 3/01* (2006.01)

(52) U.S. Cl.
CPC ................... *G06F 3/016* (2013.01)

(58) Field of Classification Search
CPC .............. G06F 3/016; G06F 3/0414
See application file for complete search history.

(56) References Cited

U.S. PATENT DOCUMENTS 8,884,747 B2* 11/2014 Woo .................. G06F 3/016
340/407.2
10,345,949 B2* 7/2019 Koseki ................ G06F 3/0488
(Continued)

FOREIGN PATENT DOCUMENTS

FR 2927709 A1 8/2009
WO 2010/085575 A1 7/2010

OTHER PUBLICATIONS

International Search Report issued in PCT/EP2016/074640 dated Jan. 13, 2017 (2 pages).
(Continued)

*Primary Examiner* — Jose R Soto Lopez
(74) *Attorney, Agent, or Firm* — Osha Bergman Watanabe & Burton

(57) ABSTRACT

The invention relates to a haptic-feedback tactile interface module, including: a tactile surface capable of detecting at least one characteristic of a pressure exerted by a user; at least one haptic-feedback actuator configured to transmit haptic feedback to the tactile surface; and a processing and control unit connected to the tactile surface and to said at least one actuator. The processing and control unit is configured so as to activate the haptic-feedback actuator in a first time window (T1) so as to induce at least one mechanical wave propagating over the tactile surface, capable of being perceived as haptic feedback, and in a second time window (T2) so as to generate at least one mechanical pulse (202-1, 202-2, 202-3) which is phase-shifted relative to the mechanical wave in order to dampen said mechanical wave.

18 Claims, 5 Drawing Sheets

(56) References Cited

U.S. PATENT DOCUMENTS

| | | | | |
|---|---|---|---|---|
| 2002/0149561 | A1* | 10/2002 | Fukumoto | G06F 3/016 345/156 |
| 2008/0198139 | A1* | 8/2008 | Lacroix | G06F 3/041 345/173 |
| 2010/0116562 | A1* | 5/2010 | Cruz-Hernandez | G06F 3/016 178/18.03 |
| 2010/0250071 | A1* | 9/2010 | Pala | B60K 35/00 701/48 |
| 2011/0012717 | A1* | 1/2011 | Pance | G06F 3/04886 340/407.2 |
| 2011/0037546 | A1* | 2/2011 | Marie | G06F 3/016 335/230 |
| 2011/0148608 | A1* | 6/2011 | Grant | G06F 3/016 340/407.2 |
| 2011/0205165 | A1* | 8/2011 | Pfau | G06F 3/016 345/173 |
| 2012/0025742 | A1* | 2/2012 | Masahiko | H02P 25/032 318/114 |
| 2012/0232780 | A1* | 9/2012 | Delson | A63F 13/803 701/400 |
| 2013/0016028 | A1* | 1/2013 | Joo | H01Q 1/244 343/883 |
| 2013/0064401 | A1* | 3/2013 | Wang | G06F 3/016 381/191 |
| 2013/0207793 | A1* | 8/2013 | Weaber | G06F 1/1626 340/407.2 |
| 2015/0097786 | A1* | 4/2015 | Behles | G06F 3/04883 345/173 |
| 2015/0097800 | A1* | 4/2015 | Grant | G06F 3/044 345/174 |
| 2015/0277562 | A1* | 10/2015 | Bard | G06F 1/169 345/177 |
| 2016/0195929 | A1* | 7/2016 | Martinez | G06F 3/03547 345/173 |
| 2016/0364001 | A1* | 12/2016 | Hirose | G06F 3/044 |
| 2017/0060243 | A1* | 3/2017 | Khoshkava | G06F 3/0416 |
| 2018/0194229 | A1* | 7/2018 | Wachinger | H03K 17/9622 |
| 2018/0287477 | A1* | 10/2018 | Zu | A63F 13/24 |
| 2018/0339592 | A1* | 11/2018 | Aubry | B60K 35/00 |

OTHER PUBLICATIONS

Written Opinion issued in PCT/EP2016/074640 dated Jan. 13, 2017 (5 pages).

French Written Opinion issued in Application No. 1559741 (5 pages).

* cited by examiner

TACTILE INTERFACE MODULE AND METHOD FOR GENERATING HAPTIC FEEDBACK

The present invention relates to a touch interface module and to a method for generating haptic feedback with a view to transmitting haptic feedback to a user.

In the motor-vehicle field, multifunction control modules, which for example take the form of a joystick or of a rotary button, are increasingly used to control electronic or electrical systems such as air conditioning systems, audio systems or even navigation systems.

Such modules may be associated with a display screen and allow drop-down menus including various commands relating to the systems to be controlled to be navigated.

However, the presence of an increasing number of increasingly complex functions has led to a multiplication of these modules. Thus, to increase the number of integrated functions and to improve the ergonomics of human-machine interfaces, use of an interface module comprising a control surface or indeed of a touch screen with a touch surface is considered to be an advantageous development.

When a user exerts pressure on the touch surface of such a sensor, it is possible to measure the pressure or force applied and/or to determine the location of the place where the pressure or force was exerted. In this case, a press of the user is for example associated with the selection of a command.

Furthermore, to signal to the user that his command has indeed been registered, whether this be in a normal driving situation or when stopped or in a degraded situation (manipulation blind or when under a substantial cognitive load), it is important for the user to receive haptic feedback so as to allow him to remain concentrated on the road and to decrease the cognitive effort associated with checking that the action of the user on the touch surface has been registered.

To achieve this end, haptic-feedback-providing control modules including actuators, such as electromagnetic actuators, that are connected to the interface module in order to transmit a vibrational movement, so that the user receives haptic feedback informing him that his command has indeed been registered, are already known.

These electromagnetic actuators include a stator bearing an electromagnet and a movable core bearing one or more permanent magnets, which core may move translationally with respect to the stator. By powering the electromagnet of the stator, the movable core is made to move and this movement is transmitted to the touchscreen.

A second type of actuator, called a "voice-coil" (or "bobine acoustique" in French) since it is associated with the technical principle of loudspeakers, is obtained in contrast by mounting the electromagnet so that it is able to move with respect to one or more fixed permanent magnets.

The Applicant's version of such a haptic-feedback-providing-touch-interface-module actuator is in particular known. The interface module comprises a touch surface that is able to detect a press of a user, and an actuator fastened to the touch surface. The actuator includes:
- a chassis;
- a movable core that interacts with the chassis and that is intended to be driven to move between extreme positions in order to generate the haptic feedback; and
- an electromagnet-comprising stator that is configured to be able to drive the movable core to move with a translational back-and-forth movement.

Via an inertial effect, the movement given to the movable core by the stator is transmitted to the chassis, which in turn transmits the vibrational movement to a touch surface to which the actuator is fastened.

At rest, the movable core, which is spring-mounted, adopts a floating rest position.

When the electromagnet is supplied with AC power, the amplitude of the back-and-forth translational movements of the motion increases to reach a maximum and then, the supply of AC power to the electromagnet is stopped.

However, even if the supply of power to the electromagnet is stopped, the induced mechanical waves continue to propagate over the touch surface and the vibrations fade away only gradually.

Studies by the Applicant have shown that the duration of these evanescent vibrations may reach 20 ms and that these vibrations may remain perceptible to a user for quite a long time.

This may be disadvantages if it is necessary to transmit, to the user, haptic feedback at closely spaced successive moments of time, with very brief, in particular shorter than 20 ms, time intervals in between.

In addition, it has been demonstrated that clear-cut and percussive haptic feedback is better perceived by a user than haptic feedback that is overly long.

The invention aims to at least partially mitigate the aforementioned drawbacks in particular by providing a haptic-feedback-providing touch interface that generates an improved, and in particular more clear-cut, haptic sensation To this end, one subject of the invention is a haptic-feedback-providing touch-interface module, comprising:
- a touch surface that is able to detect at least one characteristic of a press of a user;
- at least one haptic-feedback actuator that is configured to transmit haptic feedback to the touch surface;
- a controlling and processing unit that is connected, on the one hand, to the touch surface;
- characterized in that the controlling and processing unit is configured so as to activate the haptic-feedback actuator in a first time window so as to induce at least one mechanical wave that propagates over the touch surface and that is able to be felt as haptic feedback, and in a second time window so as to generate at least one mechanical pulse that is out of phase with respect to the mechanical wave in order to attenuate this mechanical wave.

Said haptic-feedback-providing touch-interface module may furthermore have one or more of the following features, alone or in combination.

According to one aspect, the controlling and processing unit is configured so as to activate the haptic-feedback actuator at a second time so as to generate a plurality of mechanical pulses that are out of phase with respect to the mechanical wave in order to attenuate this mechanical wave.

Provision may be made for at least one control signal transmitted by the controlling and processing unit in order to activate the actuator and generate an out-of-phase mechanical pulse to be shorter than a control signal transmitted by the controlling and processing unit in order to activate the actuator in order to induce at least one mechanical wave that propagates over the touch surface and that is able to be felt as haptic feedback.

According to one aspect, the control signal for activating the actuator allowing an out-of-phase mechanical pulse to be generated is an isolated signal.

According to one aspect, the successive signals for controlling activation of the actuator allowing a succession of out-of-phase mechanical pulses to be generated are biased oppositely in alternation.

According to yet another aspect, the energy of the out-of-phase mechanical pulses decreases.

Said at least one out-of-phase mechanical pulse is in particular in phase opposition with respect to the mechanical wave.

In addition, said at least one actuator may include:
- a chassis that is intended to make contact with the touch interface via a contact wall in order to transmit haptic feedback to the touch surface;
- a stator that is connected to the chassis;
- a movable core that is connected, via at least one elastic element, to the chassis and that is intended to be driven to move by the stator in order to generate the haptic feedback;
- an electromagnet and at least one permanent magnet, one of which is borne by the stator and the other of which is borne by the movable core; and
- a damper that is placed between the movable core and the contact wall.

Said elastic element may be dimensioned so that in the non-powered state of the electromagnet the movable core applies a bearing force in the direction of the contact wall, and so that in a powered state in which the electromagnet is powered with a predefined bias the movable core separates from the contact wall.

The spring constant of said damper is between 7.5 and 12.5 times and in particular 10 times higher than the spring constant of said elastic element.

Said damper for example takes the form of a layer of an elastomer, a silicone layer in particular.

According to another aspect, the damper has a hardness comprised between 25 and 35 and in particular of 30 shore A.

The invention also relates to a method for generating haptic feedback in a haptic-feedback-providing touch-interface module comprising a touch surface that is able to detect a press of a user such as defined above,
characterized in that it includes steps in which:
- in a first step, at least one mechanical wave that propagates over the touch surface and that is able to be felt as haptic feedback is induced; and
- in a second step at least one mechanical pulse that is out of phase with respect to the mechanical wave is generated in order to attenuate this mechanical wave.

In the second step, a plurality of mechanical pulses that are out of phase with respect to the mechanical wave may be generated in order to attenuate this mechanical wave.

According to one aspect, a signal for controlling activation of the actuator allowing an out-of-phase mechanical pulse to be generated is shorter than a signal for controlling activation of the actuator allowing at least one mechanical wave that propagates over the touch surface and that is able to be felt as haptic feedback to be induced.

According to another aspect, the signal for controlling activation of the actuator allowing an out-of-phase mechanical pulse to be generated is an isolated signal.

The successive signals for controlling activation of the actuator allowing a succession of out-of-phase mechanical pulses to be generated are biased oppositely in alternation.

According to yet another aspect, the energy of the out-of-phase mechanical pulses decreases.

Said at least one out-of-phase mechanical pulse is in phase opposition with respect to the mechanical wave.

Other advantages and features will become apparent on reading the description of the following figures, which are given by way of nonlimiting example.

In all the figures, elements that are the same have been referenced with the same references.

In certain figures, a Cartesian coordinate system X, Y, Z is indicated in order to better comprehend the orientation of the elements with respect to one another. In the present description, the Z-direction is generally perpendicular to a touch surface, provided that the latter is planar and that the X-Y plane is parallel to the plane of this touch surface.

The embodiments described are examples. Although the description refers to one or more embodiments, this does not necessarily mean that each reference relates to the same embodiment, or that the features apply only to a single embodiment. Single features of various embodiments may also be combined to create other embodiments.

Figure 1:
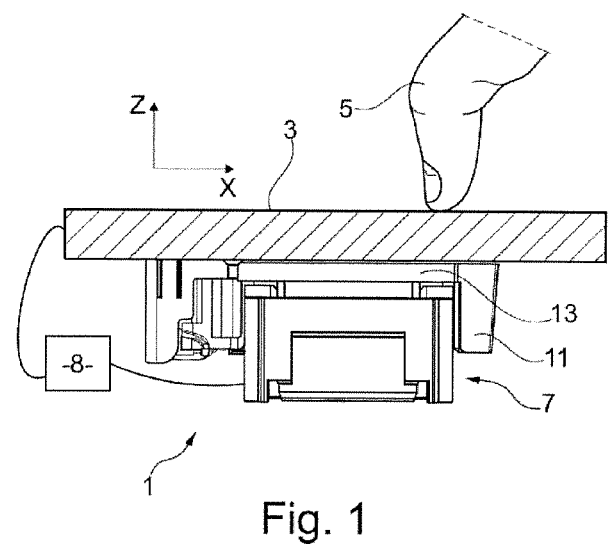
FIG. 1 is a schematic side view of one embodiment of a touch interface module with an actuator.

FIG. 1 schematically shows one embodiment of a haptic-feedback-providing touch-interface module 1 comprising a touch surface 3 that is able to detect a press, for example of a finger 5, of a user, and at least one haptic-feedback actuator 7. The number of actuators 7 may be two, three or four, or even more, and in particular depends on the size of the touch surface 3.

The haptic-feedback-providing touch-interface module 1, which is for example for a dashboard of a motor vehicle, or even for a central console of a motor vehicle, allows electronic or electrical systems of the vehicle to be controlled, and may transmit haptic feedback to a user who has for example modified or selected a command, so as to reassure the user that the selection or modification of the command has been registered.

The touch surface 3 may be planar, but it is also possible to envision outwardly curved or cambered shapes, or even shapes that are recessed. The touch surface 3 is for example equipped with a resistive or capacitive sensor for detecting at least the position of the finger 5 on the touch surface 3 and optionally in addition the path traced by the movement of the finger 5 and/or the pressure that the finger 5 exerts on the touch surface 3

This detection of the position of the finger 5 is for example associated with a pictogram-containing display menu and for example generates a control signal for controlling various pieces of equipment of a vehicle such as an air conditioning system, an audio system, a telephony system, inter alia.

The embodiment of FIG. 1 may be said to be of what is called "suspended actuator" type. By suspended, what is meant is that the actuator 7 is not connected to a casing of the touch-interface module 1, but only attached to the touch surface 3.

Of course, it is also possible to envision mounting the actuator 7 in other ways without departing from the scope of the present description.

The actuator 7 therefore forms a well-defined functional unit that is easily installed in and uninstalled from the interface module 1. Specifically, this functional unit is simply screwed or clip-fastened to the touch surface 3, and may therefore be rapidly interchanged. The actuator 7 may optionally be fastened at lower cost by adhesive bonding, at the expense of interchangeability.

The interface module 1 furthermore comprises a controlling and processing unit 8 that is connected, on the one hand, to the touch surface 3, and, on the other hand, to the actuator 7.

The controlling and processing unit 8 is for example a programmable component comprising a processor, random access memory and storage memory, and allows instructions of a stored software package to be executed. It may be a question of an application specific integrated circuit (ASIC) or even of a programmable piece of equipment of the mini-PC type.

The controlling and processing unit 8 may also be connected to a display (not shown), a display screen such as an LED or LCD panel for example, allowing control menus of various pieces of equipment of the vehicle to be displayed.

In order to give the user, whose attention must not be deviated from the road in front of him, haptic feedback, the registration of a command is signaled by activation of the actuator 7, the movement of which is transmitted to the touch surface 3.

Figure 2:
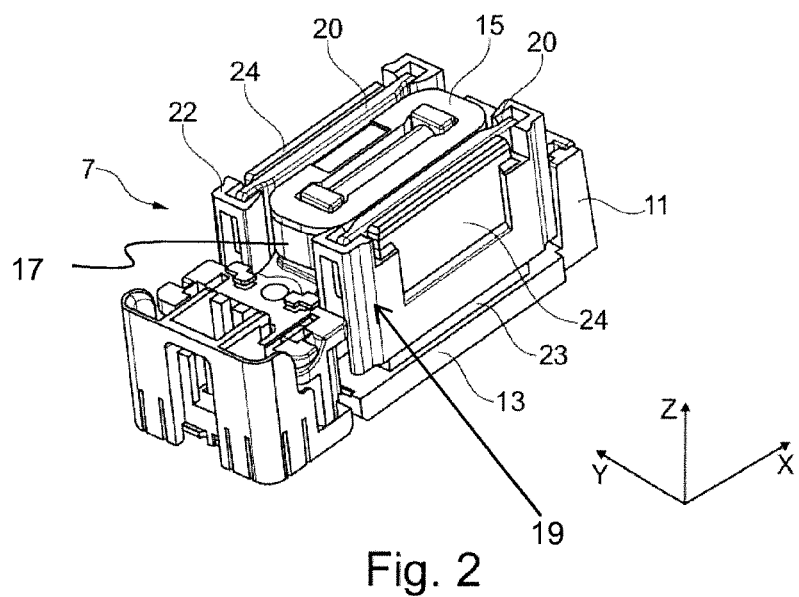
FIG. 2 is a schematic perspective view of the actuator of FIG. 1.
Figure 3:
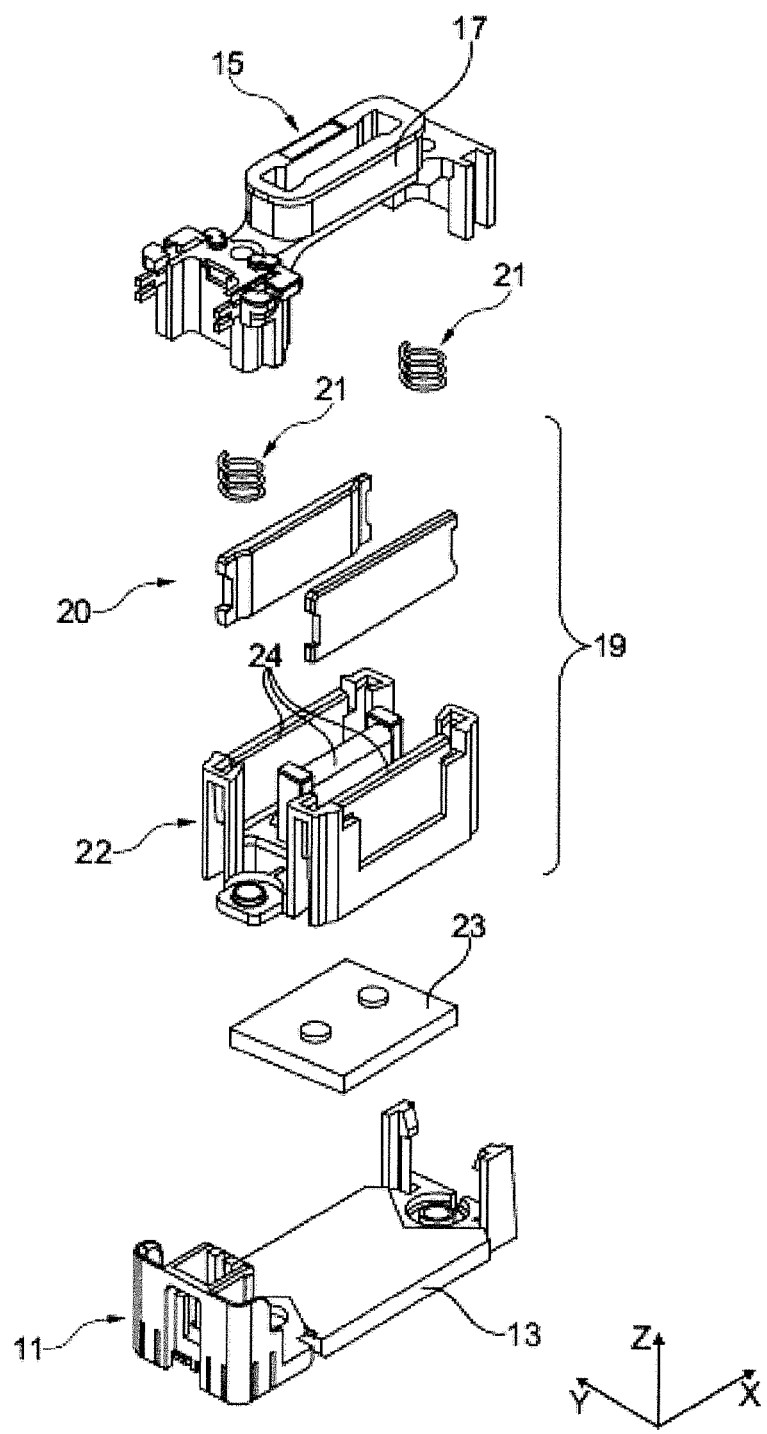
FIG. 3 is an exploded schematic perspective view of the actuator of FIG. 2.
Figure 4:
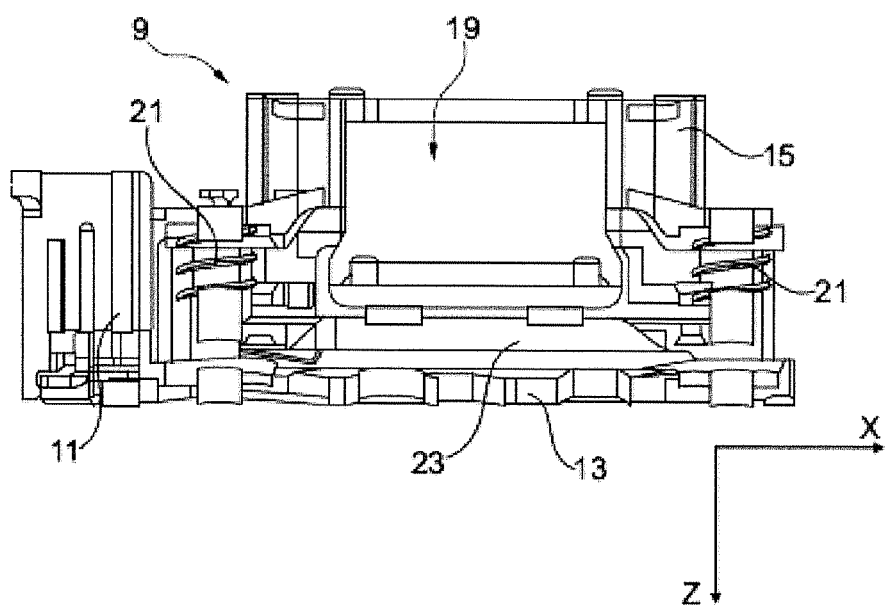
FIG. 4 is a schematic longitudinal cross-sectional view of the actuator of FIG. 2.

FIGS. 2 to 4 show one exemplary embodiment of an actuator 7, but other actuator variants or structures are envisionable.

The actuator 7 comprises a chassis 11 having a contact wall 13 that is fastened against the touch surface 3 in order to transmit haptic feedback.

The actuator 7 in addition comprises a stator 15 that is connected to the chassis 11, by clips for example. The stator 15 bears an electromagnet 17, which is for example formed by winding an electrical wire, in particular one made of copper.

The stator 15 encircles a movable core 19 in order to allow the movable core 19 to be moved, along the Z-direction, translationally in two opposite directions that are perpendicular to the contact wall 13, in order to generate the haptic feedback. The movable core 19 in particular comprises permanent magnets 20 that take the form of sheets. These permanent magnets 20 are shown in a holder 22, which is for example made of plastic and which has, in cross section, an "E" shape.

The arms of the holder 22 in addition bear ferromagnetic metal plates 24 so as to increase the weight of the movable core 19, in order to increase the kinetic energy of the movable core 19, and so as to concentrate the field lines generated by the permanent magnets 20.

The movable core 19 is imprisoned between the contact wall 13 and the stator 15 and subjected to the force of at least one, and in the present case two, elastic elements 21.

For example, in the present embodiment these elastic elements 21 are springs, in particular helicoidal compression springs, that are placed on two opposite lateral sides of the movable core 19, respectively. More precisely, one end of each spring bears against the holder 22 and the other end bears against the stator 15.

It is also possible to use an elastic material for the elastic elements 21, i.e. an elastic material such as an expanded polymer of the urethane type, an ionomer (ionically cross-linked polymer), or a rubber.

The central annular portion of the stator 15 bearing the windings of the electromagnet 17 interacts with the arms of the "E"-shaped holder 22 and guides the translational movement of the movable core 19 along Z.

The actuator 7 may include a damper 23 that is placed between the movable core 19 and the contact wall 13.

The damper 23 for example takes the form of a layer or sheet of an elastomer, in particular of silicone, which may be overmolded onto the movable core 19 and/or be joined with the movable core 19 by shape engagement as shown in FIG. 3. As may be seen in FIGS. 2 to 4, the damper 23 is fastened to the back of the "E"-shaped holder 22.

According to one variant (not shown) the damper 23 is fastened to the contact wall 13. However, it is preferable for the damper 23 to be fastened to the movable core 19 in order to increase the weight of this group of moving parts and therefore the kinetic energy transmitted when it impacts the contact wall 13.

The damper 23 in particular has a hardness comprised between 25 and 35 and in particular of 30 shore A.

The one or more elastic elements 21 are dimensioned and stressed so that in the non-powered state of the electromagnet 17 the movable core 19 applies a bearing force in the direction of the contact wall 13, so that the damper 23 is pressed against the contact wall 13. In a powered state in which the electromagnetic is powered with a predefined bias, the movable core 19 separates from the contact wall 13.

The spring constant of said damper 23 is between 7.5 and 12.5 times and in particular 10 times higher than the spring constant of said elastic element 21.

Figure 5:
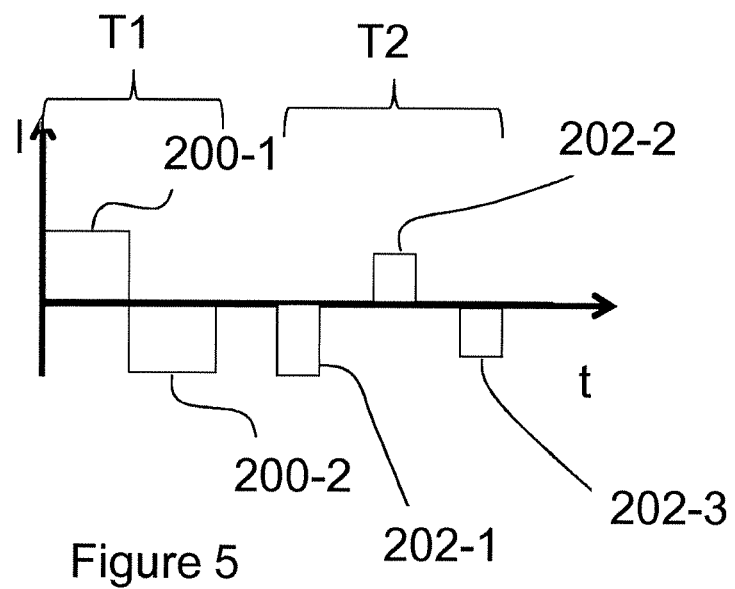
FIG. 5 is a graph of control signals applied to an actuator.
Figure 6:
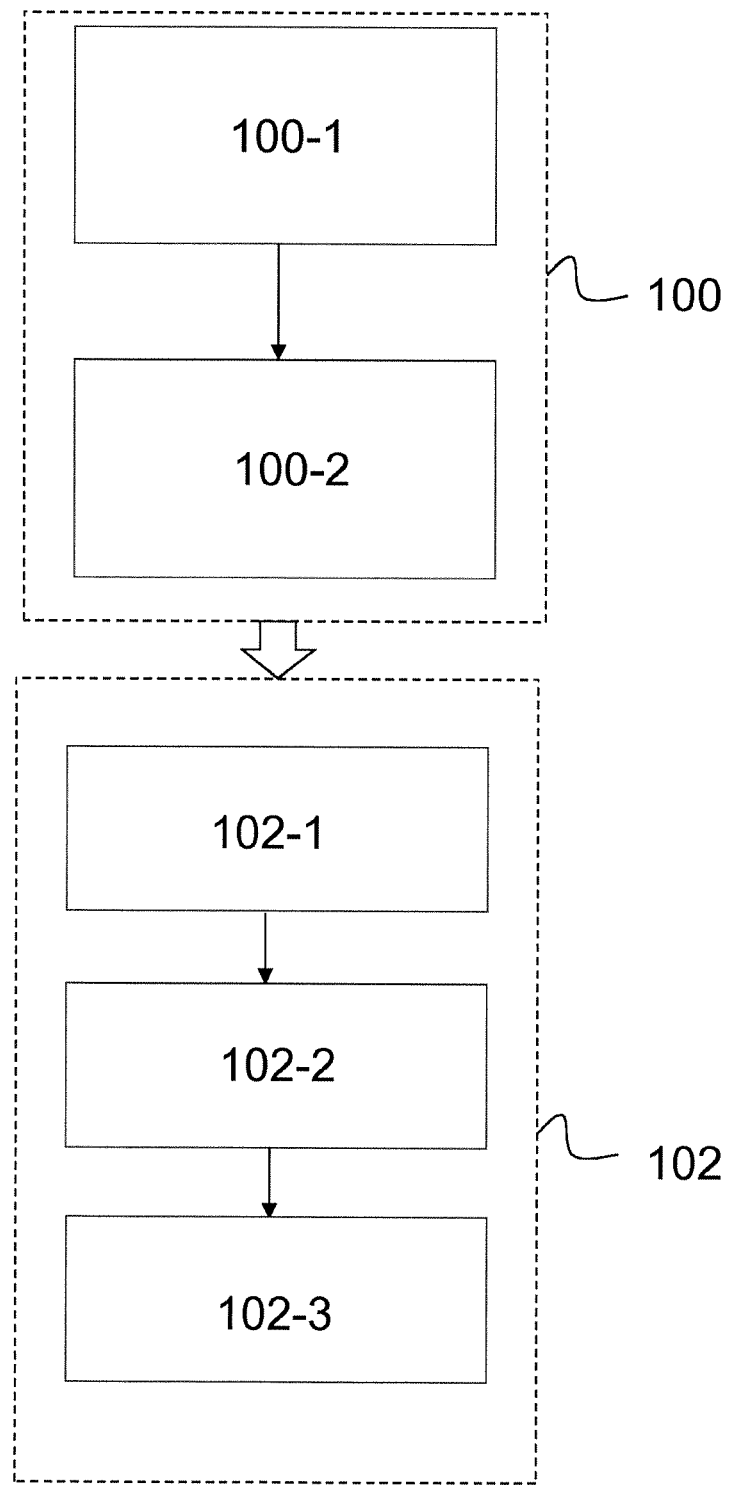
FIG. 6 is a flowchart of one embodiment of a method for generating haptic feedback.

FIG. 5 shows, as a function of time, a graph of control signals applied to an actuator 7, and FIG. 6 shows a flowchart of a method for generating haptic feedback according to one embodiment.

In a first step 100, during the time window T1, on reception of a signal from the touch surface 3, which signal was caused by a press of a finger 5, the controlling and processing unit 8 transmits, for example, in a first substep 100-1, a first control signal 200-1. The first control signal 200-1 has a first predefined bias and for example takes the form of a square wave that supplies the electromagnet 17 with current in a first direction along the Z direction so as to separate the movable core 19 from the contact wall 13 of the frame 11, against the force of the elastic elements 21 (the compression springs compress).

The elastic elements 21 therefore store, in this phase, some of the kinetic energy communicated to the movable core 19.

Of course, the unit 8 may be configured to supply the electromagnetic 17 with current directly. However, according to one variant, it may also for example transmit a control signal to a relay through which power is supplied to the electromagnet 17.

The duration of this first control signal 200-1 is sufficiently long that the separation of the movable core 19 is maximized, for example a duration comprised between 4 ms and 6 ms, and in particular of 5 ms.

Next, in a second substep 100-2, the controlling and processing unit 8 transmits a second control signal 200-2 with a second predefined bias opposite the first bias, this signal for example also being a square wave. This second control signal 200-2 inverts the direction of the current in order to invert the magnetic field so as to propel the movable core 19 in the direction of the contact wall 13 of the chassis 11 and to maintain the movable core 19 in abutment against this contact wall 13. The elastic elements 21 assist, in this phase, the movement of the movable core 19 (the compression springs relax).

Because the movable core 19 here only makes one round-trip, "percussive" haptic feedback, such as an impact that may be easily felt by the finger 5 of the user, is then obtained.

The duration of this second control signal 200-2 is a duration comprised between 4 ms and 6 ms, and in particular of 5 ms.

Of course, the durations of the control signals 200-1 and 200-2 may be different. It is also possible to envision different forms of control signals and different amplitudes without departing from the scope of the present description.

This first step 100 therefore serves to activate the haptic-feedback actuator 7 so as to induce at least one mechanical wave that propagates over the touch surface 3 and that is able to be felt as haptic feedback.

Figure 7:
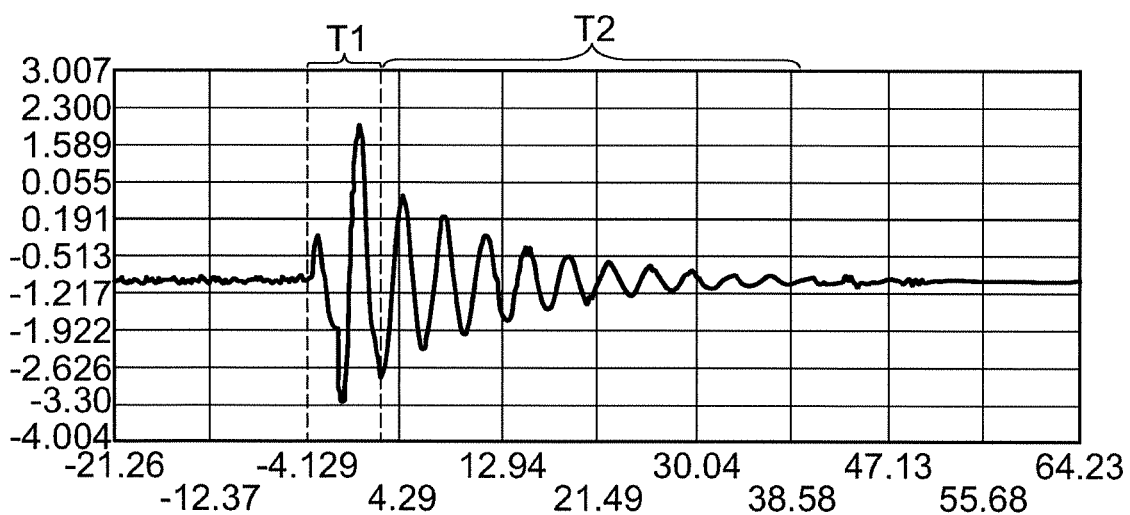
FIGS. 7 and 8 show graphs showing the oscillation of the touch surface as a function of time, for two different cases.

FIG. 7 shows the oscillations on the touch surface 3 in the case where only this first step 100 is carried out.

As may be seen, on the one hand, a signal that corresponds to the mechanical wave induced by step 100 is observed in the time window T1, and, on the other hand, a signal corresponding to an evanescent mechanical wave, the amplitude of which decreases gradually and which may be disadvantageous, is observed in the time window T2.

It is therefore sought to attenuate, if possible very strongly, this evanescent mechanical wave.

To do this, in a second step 102, during a time window T2, the haptic-feedback actuator 7 is actuated so as to generate at least one mechanical pulse that is out of phase, and in the present case three mechanical pulses that are out of phase, with respect to the mechanical wave, in order to attenuate this mechanical wave. The phase shift is in particular set to achieve phase opposition, in order to obtain a maximum attenuation.

To this end, the controlling and processing unit 8 transmits, for example in a first substep 102-1, a first signal 202-1 with the second predefined bias, this signal for example taking the form of a square wave that supplies the electromagnet 17 with current in the second direction along the Z direction, so as to press the movable core 19 with the damper 23 against the contact wall 13. As may be seen, the first control signal 202-1 has the same bias and the same amplitude as the second control signal 200-2, but it is shorter than the latter, for example of between 1.5 ms and 3 ms, and typically 2 ms, in length.

It may also be seen that the control signal 202-1 is isolated, i.e. just before and just after the control signal 202-1, the actuator 7 is not supplied with current.

Next, in a second substep 102-2, a second control signal 202-2 with the first predefined bias is transmitted to the electromagnet 17, this having the effect of separating the movable core 19 from the contact wall 13 of the chassis 11, against the force of the elastic elements 21, but to a lesser extent than in the first substep 100-1, given that the control signal 202-2 has a smaller amplitude. The control signal 202-2 therefore has a bias that is inverted with respect to the control signal 202-1 and an amplitude that is smaller in absolute value than the control signal 202-1. The control signal 202-2 is also an isolated signal.

Lastly, in a third substep 102-3, a third signal 202-3 with the second predefined bias is transmitted to the electromagnet 17, this having the effect of pressing the movable core 19 with the damper 23 against the contact wall 13. As may be seen, the control signal 202-3 has the same bias but a smaller amplitude than the control signal 202-1. The control signal 202-3 is also an isolated signal.

It may therefore be seen that the control signals 202-1, 202-2 and 202-3 are pulses that are alternately and oppositely biased and that their energy, which corresponds to the area of the pulses, decreases.

Figure 8:
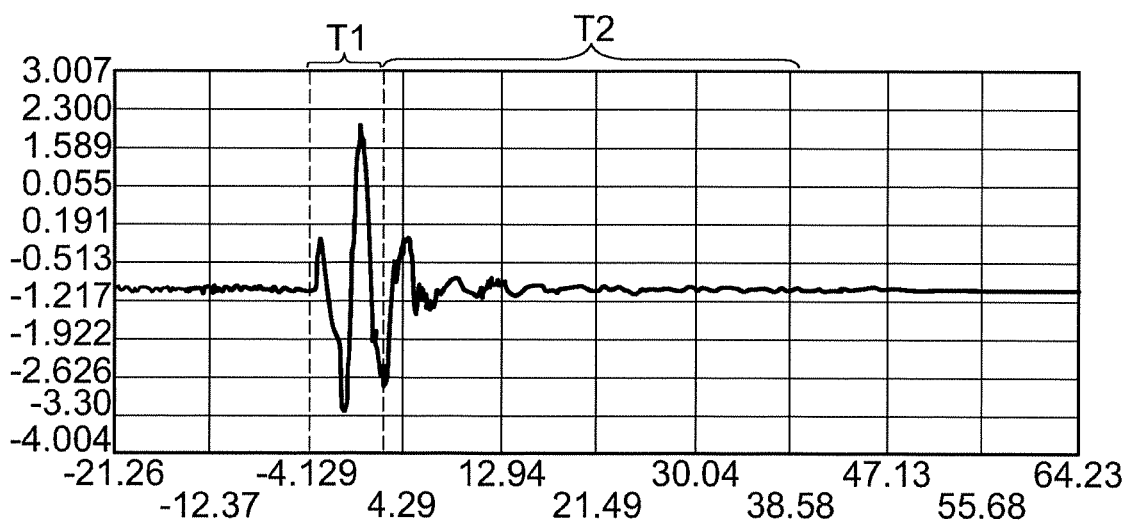

The effect of the control signals 202-1, 202-2 and 202-3 of the second step 102 on the evanescent mechanical wave is shown in FIG. 8. With respect to FIG. 7, it may clearly be seen that the signal corresponding to the evanescent mechanical wave is greatly decreased.

For a user, the haptic feedback therefore appears to be more percussive and shorter.

It will therefore be understood that the out-of-phase mechanical pulses allow haptic feedback that is more clear-cut and therefore better appreciated by the user to be obtained.

The position of the control signals 202-1, 202-2 and 202-3 naturally depends on various parameters such as for example the size of the touch surface 3, the material from which the touch surface 3 is made, whether or not the touch surface 3 is suspended, etc.

The position in time of the control signals 202-1, 202-2 and 202-3 and their amplitudes for a given configuration of a haptic-feedback-providing interface module 1 may be obtained iteratively in the following way:

An accelerometer is for example placed on the touch surface 3 in order to allow the one or more mechanical waves on the touch surface 3 to be measured and the output of the accelerometer is plugged into an oscilloscope.

Next, the first step 100 is carried out in order to induce a mechanical wave on the touch surface 3 and a graph similar to that of FIG. 7 is obtained.

Next, a first control signal 202-1 is transmitted in order to power the electromagnet 17 and to generate a first mechanical pulse 202-1 in phase opposition with the mechanical wave induced by the first step 100.

The attenuation of the mechanical wave is observed in order to determine the new temporal position of the troughs of the mechanical wave. Next, the electromagnet 17 is supplied with the second control signal 202-2, this second signal 202-2 being placed, with respect to the temporal position of the troughs of the mechanical wave observed beforehand, so as to be in phase opposition with the evanescent mechanical wave. The attenuating effect of the mechanical wave induced by the two control signals 202-1 and 202-2 is once again observed in order to determine the new temporal position of the troughs of the mechanical wave. This process is begun again by supplying the electromagnet 17 with the third control signal 202-3, this third signal 202-3 being placed, with respect to the temporal position of the troughs of the mechanical waves, i.e. the temporal position observed beforehand, so as to be in phase opposition with the evanescent mechanical wave.

Once the values and the temporal position of the pulses of the control signals have been identified, it is possible to program them as control instructions in one of the memories of the controlling and processing unit 8.

It will therefore be understood that the specific excitation of the actuator 7 during the time window T2 allows evanescent mechanical waves on the touch surface 3 to be greatly decreased and thus the user's perception of the haptic feedback to be improved.

Moreover, in the case of a touch surface 3 equipped with a plurality of actuators 7, it is enough, generally, to activate a single actuator 7 during the time window T2 to obtain a satisfactory attenuation of the evanescent mechanical wave.

However, provision may furthermore be made to also activate a plurality of actuators 7 during T2, or indeed to actuate actuators 7 one by one in turn, for example one for the control signal 202-1, another for the control signal 202-2 and a third for the control signal 202-3.

Of course, other variants are envisionable without departing from the scope of the present description. Thus, the electromagnet 17 may be borne by the movable core 19 and the permanent magnet 20 by the stator for a "voice-coil" configuration.

The invention claimed is:

1. A haptic-feedback-providing touch-interface module, comprising:
   a touch surface that is able to detect at least one characteristic of a press of a user;
   at least one haptic-feedback actuator that is configured to transmit haptic feedback to the touch surface, the at least one haptic-feedback actuator comprising: a movable core that is connected to a chassis via at least one elastic element, an electromagnet and at least one permanent magnet, wherein the chassis makes contact with the touch interface via a contact wall to transmit haptic feedback to the touch surface, and;
   a controlling and processing unit that is connected, to the touch surface, and to said at least one actuator,
   wherein the controlling and processing unit is configured to activate the haptic-feedback actuator in a first time window to induce at least one mechanical wave that propagates over the touch surface and that is able to be felt as haptic feedback, and in a second time window to generate at least one mechanical pulse that is out of phase with respect to the mechanical wave to attenuate the mechanical wave,
   wherein at least one control signal transmitted by the controlling and processing unit to activate the haptic-feedback actuator and generate an out-of-phase mechanical pulse is an isolated signal,
   wherein, when the at least one control signal is the isolated signal, the haptic-feedback actuator is not supplied with an electric current just before and just after the at least one control signal, and
   wherein the at least one elastic element is dimensioned so that in a non-powered state of the electromagnet, the movable core applies a bearing force in a direction of the contact wall, and so that in a powered state in which the electromagnet is powered with a predefined bias, the movable core separates from the contact wall.

2. The interface module as claimed in claim 1, wherein the controlling and processing unit is configured to activate the haptic-feedback actuator at a second time so as to generate a plurality of mechanical pulses that are out of phase with respect to the mechanical wave in order to attenuate this mechanical wave.

3. The interface module as claimed in claim 2, wherein the at least one control signal for activating the haptic-feedback actuator allowing the out-of-phase mechanical pulse to be generated is shorter than a control signal transmitted by the controlling and processing unit to activate the haptic-feedback actuator to induce at least one mechanical wave that propagates over the touch surface and that is able to be felt as haptic feedback.

4. The interface module as claimed in claim 1, wherein the successive signals for controlling activation of the haptic-feedback actuator allowing a succession of out-of-phase mechanical pulses to be generated are biased oppositely in alternation.

5. The interface module as claimed in claim 4, wherein the energy of the out-of-phase mechanical pulses decreases.

6. The interface module as claimed in claim 1, wherein said at least one out-of-phase mechanical pulse is in phase opposition with respect to the mechanical wave.

7. The interface module as claimed in claim 1, wherein said at least one haptic-feedback actuator further includes:
   a stator that is connected to the chassis;
   a damper that is placed between the movable core and the contact wall,
   wherein the movable core that is connected, via the at least one elastic element, to the chassis and that is driven to move by the stator to generate the haptic feedback, and
   wherein one of the electromagnet and the at least one permanent magnet is borne by the stator and the other of the electromagnet and the at least one permanent magnet is borne by the movable core.

8. The interface module as claimed in claim 7, wherein the spring constant of said damper is 10 times higher than the spring constant of said elastic element.

9. The interface module as claimed in claim 7, wherein said damper takes the form of a layer of an elastomer, a silicone layer in particular.

10. The interface module as claimed in claim 7, wherein the damper has a hardness of 30 shore A.

11. A method for generating haptic feedback in a haptic-feedback-providing touch-interface module comprising a touch surface that is able to detect a press of a user and as claimed in claim 1, the method comprising:
    a first step, at least one mechanical wave that propagates over the touch surface and that is able to be felt as haptic feedback is induced; and
    a second step at least one mechanical pulse that is out of phase with respect to the mechanical wave is generated in order to attenuate this mechanical wave.

12. The method as claimed in claim 11, wherein, in the second step, a plurality of mechanical pulses that are out of phase with respect to the mechanical wave are generated in order to attenuate this mechanical wave.

13. The method as claimed in claim 12, wherein a signal for controlling activation of the haptic-feedback actuator allowing an out-of-phase mechanical pulse to be generated is shorter than a signal for controlling activation of the haptic-feedback actuator allowing at least one mechanical wave that propagates over the touch surface and that is able to be felt as haptic feedback to be induced.

14. The method as claimed in claim 13, wherein the signal for controlling activation of the haptic-feedback actuator allowing an out-of-phase mechanical pulse to be generated is an isolated signal.

15. The method as claimed in claim 11, wherein the successive signals for controlling activation of the haptic-feedback actuator allowing a succession of out-of-phase mechanical pulses to be generated are biased oppositely in alternation.

16. The method as claimed in claim 15, wherein the energy of the out-of-phase mechanical pulses decreases.

17. The method as claimed in claim 11, wherein said at least one out-of-phase mechanical pulse is in phase opposition with respect to the mechanical wave.

18. A haptic-feedback-providing touch-interface module, comprising:
    a touch surface that is able to detect at least one characteristic of a press of a user;
    at least one haptic-feedback actuator that is configured to transmit haptic feedback to the touch surface;

a controlling and processing unit that is connected, on the one hand, to the touch surface, and, on the other hand, to said at least one actuator, wherein the controlling and processing unit is configured to activate the haptic-feedback actuator in a first time window to induce at least one mechanical wave that propagates over the touch surface and that is able to be felt as haptic feedback, and in a second time window to generate at least one mechanical pulse that is out of phase with respect to the mechanical wave to attenuate this mechanical wave, wherein at least one control signal transmitted by the controlling and processing unit to activate the haptic-feedback actuator and generate an out-of-phase mechanical pulse is an isolated signal, wherein the haptic-feedback actuator is not supplied with an electric current just before and just after the at least one control signal, and wherein said at least one haptic-feedback actuator includes:

a chassis that makes contact with the touch interface via a contact wall in order to transmit haptic feedback to the touch surface;

a stator that is connected to the chassis;

a movable core that is connected, via at least one elastic element, to the chassis and that is driven to move by the stator to generate the haptic feedback;

an electromagnet and at least one permanent magnet, one of which is borne by the stator and the other of which is borne by the movable core; and a damper that is placed between the movable core and the contact wall, and wherein said at least one elastic element is dimensioned so that in the non-powered state of the electromagnet the movable core applies a bearing force in the direction of the contact wall, and so that in a powered state in which the electromagnet is powered with a pre-defined bias the movable core separates from the contact wall.

* * * * *